US006632861B1

(12) United States Patent
Weitzel et al.

(10) Patent No.: US 6,632,861 B1
(45) Date of Patent: Oct. 14, 2003

(54) SELF-LEVELING SCREEDS AND TROWEL-APPLIED FLOORING COMPOSITIONS CONTAINING DISPERSION POWDER COMPOSITIONS BASED ON VINYLAROMATIC-1,3-DIENE COPOLYMERS

(75) Inventors: Hans-Peter Weitzel, Reishach (DE); Theo Mayer, Julbach (DE); Reinhard Härzschel, Burghausen (DE)

(73) Assignee: Wacker-Chemie GmbH, Munich (DE)

( * ) Notice: Subject to any disclaimer, the term of this patent is extended or adjusted under 35 U.S.C. 154(b) by 0 days.

(21) Appl. No.: 09/787,621

(22) PCT Filed: Oct. 14, 1999

(86) PCT No.: PCT/EP99/07706

§ 371 (c)(1),
(2), (4) Date: Mar. 20, 2001

(87) PCT Pub. No.: WO00/30990

PCT Pub. Date: Jun. 2, 2000

(30) Foreign Application Priority Data

Nov. 19, 1998 (DE) .......................................... 198 53 420

(51) Int. Cl.⁷ ................................................ C08K 3/00
(52) U.S. Cl. ........................................................ 524/8
(58) Field of Search ................................................ 524/8

(56) References Cited

U.S. PATENT DOCUMENTS

| 3,784,648 | A |   | 1/1974 | Bergmeister et al. | .......... 524/3 |
| 5,118,751 | A |   | 6/1992 | Schulze et al. | ................. 524/5 |
| 5,147,907 | A |   | 9/1992 | Rinck et al. | .................... 524/48 |
| 5,994,428 | A | * | 11/1999 | Lutz et al. | ................... 523/201 |
| 6,084,018 | A | * | 7/2000 | Wildburg et al. | ............ 524/424 |
| 6,114,423 | A |   | 9/2000 | Eck et al. | .................... 524/265 |
| 6,444,729 | B1| * | 9/2002 | Pakusch et al. | ................ 524/5 |

FOREIGN PATENT DOCUMENTS

| DE | 2 049 114   | 4/1972 |
| DE | 2 102 456   | 7/1972 |
| DE | 2 064 081   | 9/1972 |
| DE | 2 301 435   | 8/1974 |
| DE | 2 534 564   | 2/1977 |
| DE | 3 028 559   | 2/1982 |
| DE | 195 26 759  | 1/1997 |
| EP | 0 116 524   | 8/1984 |
| EP | 0 408 099   | 1/1991 |
| EP | 0 477 900   | 4/1992 |
| EP | 0 537 411   | 4/1993 |
| EP | 0 821 016   | 1/1998 |
| GB | 1 325 518   | 8/1973 |
| GB | 2 083 015   | 3/1982 |

OTHER PUBLICATIONS

The periodical TIZ (Ton industrie–Zeitung) 9, p. 698 (1985).
Derwent Abstract corresponding to DE–B 2 064 081 (AN 1972–61165T).
Derwent Abstract corresponding to DE–B 2 301 435 (AN 1974–56989V).
Derwent Abstract corresponding to DE 2 534 564 (AN 1977–09632Y).
Fox T.G., Bull. Am. Physics Soc. 1, 3, p. 123 (1956).
Polymer Handbook, 2$^{nd}$ Edition, J. Wiley & Sons, New York (1975).

* cited by examiner

*Primary Examiner*—Peter Szekely
(74) *Attorney, Agent, or Firm*—Brooks Kushman P.C.

(57) ABSTRACT

Self-leveling screeds and trowel-applied flooring compositions are provided containing dispersion powder compositions based on vinylaromatic-1,3-diene copolymers. The use of these copolymers in the flooring compositions dispensing with the need for fully hydrolyzed copolymers made from 1-alkylvinyl esters and from vinyl esters while obtaining good wear resistance, scratch resistance and adhesion.

21 Claims, No Drawings

SELF-LEVELING SCREEDS AND TROWEL-APPLIED FLOORING COMPOSITIONS CONTAINING DISPERSION POWDER COMPOSITIONS BASED ON VINYLAROMATIC-1,3-DIENE COPOLYMERS

BACKGROUND OF THE INVENTION

1) Field of the Invention

The invention relates to the use of water-redispersible, protective-colloid-stabilized dispersion powder compositions based on vinylaromatic-1,3-diene copolymers in self-leveling screeds and trowel-applied flooring compositions.

2) Background Art

For many years, dispersion powders have been used, particularly in the construction sector, as a polymeric improver for hydraulically setting systems. An overview of the action of dispersion powders is given in the periodical TIZ (Tonindustrie-Zeitung) 9, p. 698 (1985). Especially the properties of adhesion, wear resistance, scratch resistance and bend resistance of hydraulically setting compositions are improved by adding dispersion powders. Examples of descriptions of these dispersion powders are found in DE-A-2049114 (U.S. Pat. No. 3,784,648), and they are prepared by spray drying aqueous polymer dispersion powders with addition of polyvinyl alcohol and of other additives. The resultant powder, with good free flow and with particle sizes from 10 to 250 $\mu$m, redisperses in water to give a dispersion with particle sizes from 0.1 to 5 $\mu$m. This redispersion should remain stable over a prolonged period, i.e. should not show any tendency toward sedimentation.

An important application sector for dispersion powders is that of hydraulically setting trowel-applied flooring compositions. These trowel-applied flooring compositions have been disclosed in DE-A 3028559 (GB-A 2083015) and EP-A 116524, and are generally composed of cement or mixtures of different cements, carefully balanced filler combinations, dispersion powders, plasticizers and, where appropriate, other additives. DE-A 3028559 proposes modifying the compositions with comminuted elastomers and with dispersion powder based on vinyl acetate-ethylene copolymers. EP-A 116524 recommends the use of polymer powders or polymer dispersions for providing elasticity when producing flowable compositions, the polymer powders recommended being those based on vinyl ester polymers.

DE-B 2064081, DE-B 2102456 (GB-A 1325518), DE-B 2301435 and DE-B 2534564 recommend using polyvinyl acetate dispersion powders as an additive in flowable compositions. The flowable compositions are generally in dry mortar from when they are delivered to the building site, where they are simply mixed with water and spread on the floor. The materials flow out to give a smooth surface which serves directly as the wear layer or serves as substrate for further coatings. This usage always give problems. Particularly when relatively thick layers are applied, uneven areas, such as craters or pinholes, form on the surface. The surface does not become as smooth as the purchaser desires, and requires further work.

The procedure used hitherto to avoid uneven areas of this type has been to use additives. EP-A 477900 (U.S. Pat. No. 5,118,751) recommends the use of fully hydrolyzed copolymers made from 1-alkylvinyl esters and from vinyl esters to eliminate these problems. However, these additives are relatively complicated to prepare and increase the cost of the dispersion powder composition to an unacceptable degree.

It is an object of the present invention, therefore, to eliminate the disadvantages described above for known trowel-applied flooring compositions, in relation to the surface quality of coatings produced from these, without the use of fully hydrolyzed copolymers made from 1-alkylvinyl esters and from vinyl esters, but to do this without losing the advantages gained by adding dispersion powders, for example improved wear resistance, scratch resistance and adhesion.

SUMMARY OF THE INVENTION

Surprisingly, it has been found that the use of powders based on protective-colloid-stabilized vinylaromatic-1,3-diene polymers enables the use of fully hydrolyzed copolymers made from 1-alkylvinyl esters and from vinyl esters to be dispensed with, while retaining equivalent surface qualities and at the same time obtaining good wear resistance, scratch resistance and adhesion.

The invention provides the use of water-redispersible, protective-colloid-stabilized dispersion powder compositions in self-leveling screeds or trowel-applied flooring compositions, wherein the dispersion powder composition comprises a) a base polymer selected from the group consisting of the vinylaromatic-1,3-diene polymers, b) from 2 to 25% by weight, based on the base polymer, of one or more protective colloids, c) from 3 to 30% by weight, based on the total weight of polymeric constituents, of fine antiblocking agent, and d) from 0.1 to 10% by weight, based on the base polymer, of other additives.

DESCRIPTION OF THE PREFERRED EMBODIMENTS

Suitable vinylaromatic compounds are styrene and methylstyrene, copolymerization of styrene being preferred. Examples of 1,3-dienes are 1,3-butadiene and isoprene, 1,3-butadiene being preferred. The copolymers generally contain from 20 to 80% by weight, preferably from 30 to 70% by weight, of vinylaromatic compound, and from 20 to 80% by weight, preferably from 30 to 70% by weight, of 1,3-diene, and other monomers may also be present where appropriate, and the percentage by weight data always give 100% by weight in total.

Up to 30% by weight, based on the total weight of the monomer phase, of other monomers copolymerizable with vinylaromatic compounds and with 1,3-dienes may be copolymerized where appropriate, for example ethylene, vinyl chloride, (meth)acrylates of alcohols having from 1 to 15 carbon atoms, or vinyl esters of unbranched or branched carboxylic acids.

From 0.05 to 10% by weight, based on the total weight of the monomer mixture, of auxiliary monomers may also be copolymerized where appropriate. Examples of auxiliary monomers are ethylenically unsaturated mono- and dicarboxylic acids, preferably acrylic acid, methacrylic acid, fumaric acid or maleic acid; ethylenically unsaturated carboxamides and carbonitriles, preferably acrylamide or acrylonitrile;. mono- and diesters of fumaric acid or maleic acid, such as the diethyl or diisopropyl esters, and also maleic anhydride, ethylenically unsaturated sulfonic acids and salts of these, preferably vinylsulfonic acid, and 2-acrylamido-2-methylpropanesulfonic acid. Other examples are pre-crosslinking comonomers, such as comonomers with two or more ethylenic unsaturations, such as divinyl adipates, diallyl maleate, allyl methacrylate or triallyl cyanurate, or postcrosslinking comonomers, such as acrylamidoglycolic acid (AGA), methyl methylacrylamidoglycolate (MAGME), N-methylol-acrylamide (NMA), N-methylolmethacrylamide, allyl N-methylolcarbamate, alkyl ethers, such as isobutoxy ether, or esters of N-methylolacrylamide, of N-methylolmethacrylamide, or of allyl N-methylol-carbamate. Other suitable comonomers are epoxy-functional comonomers, such as glycidyl methacrylate and glycidyl acrylate. Other examples of comonomers are silicon-functional comonomers, such as acryloxypropyltri(alkoxy)- and methacryloxypropyltri(alkoxy)silanes, vinyltrialkoxysilanes and vinylmethyldialkoxysilanes, examples of alkoxy groups which may be present being ethoxy radicals and ethoxy(propylene glycol) ether radicals. Mention may also be made of monomers having hydroxyl or CO groups, for example hydroxyalkyl methacrylates and hydroxyalkyl acrylates, such as hydroxyethyl, hydroxypropyl and hydroxybutyl acrylates and the corresponding methacrylates, and also compounds such as diacetoneacrylamide and acetylacetoxyethyl acrylate and the corresponding methacrylate.

The selection of monomer here, and the selection of the portions by weight of the comonomers, is generally such as to give a glass transition temperature Tg of from −70 to +70° C., preferably from −50 to +50° C., particularly preferably from −20 to +40° C. The glass transition temperature Tg of the polymers may be determined in a known manner by differential scanning calorimetry (DSC). The Tg can also be approximated in advance by using the Fox equation. According to T. G. Fox, Bull. Am. Physics Soc. 1, 3, page 123 (1956): $1/Tg = x_1/Tg_1 + x_2/Tg_2 + \ldots + x_n/Tg_n$, where $x_n$ is the proportion by weight (% by weight/100) of the monomer n and $Tg_n$ is the glass transition temperature in degrees Kelvin of the homopolymer of the monomer n. Tg values for homopolymers are listed in Polymer Handbook 2nd Edition, J. Wiley & Sons, New York (1975).

Protective colloids suitable as component b) are for example polyvinyl alcohols, polysaccharides in water-soluble form, for example starches (amylose and amylopectin), modified starches, for example starch ethers, such as hydroxyalkyl ether starches, dextrins and cyclodextrins, celluloses and their carboxymethyl, methyl, hydroxyethyl and hydroxypropyl derivatives, poly(meth)acrylic acid, poly(meth)acrylamide, melamine-formaldehyde sulfonates, and naphthalene-formaldehyde sulfonates.

Preference is given to polyvinyl alcohols having a degree of hydrolysis of from 80 to 95 mol % and a Höppler viscosity of from 1 to 30 mPas in 4% strength aqueous solution (Höppler method at 20° C., DIN 53015). Other suitable materials are hydrophobically modified polyvinyl alcohols having a degree of hydrolysis of from 80 to 95 mol % and a Höppler viscosity of from 1 to 30 mPas in 4% strength aqueous solution. Examples of these are partially hydrolyzed copolymers of vinyl acetate with hydrophobic comonomers, such as isopropenyl acetate, vinyl pivalate, vinyl ethylhexanoate, vinyl esters of saturated alpha-branched monocarboxylic acids having 5 or 9, to 11 carbon atoms, dialkyl maleates or dialkyl fumarates, such as diisopropyl maleate or diisoproypl fumarate, vinyl chloride, vinyl alkyl ethers, such as vinyl butyl ether, or olefins, such as ethene or decene. The proportion of hydrophobic units is preferably from 0.1 to 10% by weight, based on the total weight of the partially hydrolyzed polyvinyl acetate, these hydrophobically modified polyvinyl alcohols producing a surface tension <40 mN/m in 2% strength aqueous solution. It is also possible to use mixtures of the polyvinyl alcohols mentioned.

Antiblocking agents suitable as component c) are known to the skilled worker. Examples of these are calcium carbonate, magnesium carbonate, talc, gypsum, silica, and silicates, such as magnesium hydrosilicate. The particle size is generally from 10 nm to 10 µm.

Other components present as component d) in the dispersion powder compositions are antifoams, pigments, fillers, foam stabilizers, hydrophobicizing agents, wetting agents, and cement plasticizers. The amounts in which the constituents mentioned may be added, if desired, are those known to the skilled worker.

The protective-colloid-stabilized polymer powders are prepared in a known manner by emulsion polymerization, the polymerization temperature generally being from 40 to 100° C., preferably from 60 to 90° C. When gaseous comonomers, such as ethylene or vinyl chloride, are copolymerized, it is also possible to operate at superatmospheric pressure, generally at from 5 to 100 bar. The polymerization is initiated with the initiators or redox-initiator combinations which are commonly used for emulsion polymerization, for example hydroperoxides, such as tert-butyl hydroperoxide, azo compounds, such as azobisisobutyronitrile, or inorganic initiators, such as the sodium, potassium or ammonium salts of peroxodisulfuric acid. The initiators mentioned are generally used in amounts of from 0.05 to 3% by weight, based on the total weight of the monomers. The redox initiators used comprise combinations of the initiators mentioned with reducing agents, such as sodium sulfite, sodium hydroxymethanesulfinate, or ascorbic acid. The amount of reducing agent is preferably from 0.01 to 5.0% by weight, based on the total weight of the monomers.

The polymerization mixture is stabilized using the amount mentioned of the abovementioned protective colloids b), and preferably without the use of any emulsifiers. It is preferable to use the partially hydrolyzed polyvinyl acetates and partially hydrolyzed hydrophobicized polyvinyl acetates mentioned. The amount of the protective colloids generally used during the polymerization is from 1 to 15% by weight, based on the total weight of the monomers. It is preferable here for part of the protective colloid content to be an initial charge and part to be fed once the polymerization has been initiated. The monomers may be entirely an initial charge, entirely a feed, or partly an initial charge, with the remainder fed once the polymerization has been initiated.

In the preferred embodiment, the dispersion powders used to produce the flowable compositions are those in which the vinylaromatic-1,3-diene, polymer a) has been produced by emulsion polymerization of at least one vinylaromatic compound and of at least one 1,3-diene in the presence of the protective colloid b), particularly preferably without the use of any emulsifiers.

The aqueous dispersions obtainable by the processes mentioned have a solids content of from 30 to 75% by weight, preferably from 40 to 65% by weight. To produce the water-redispersible dispersion powders, the aqueous dispersions are dried, preferably spray dried. This spray drying takes place in conventional spray drying systems, and the atomization process here may take place using single-, twin- or multiple-fluid nozzles, or using a rotating disc. The discharge temperature is generally in the range from 55 to 100° C., preferably from 70 to 90° C., depending on the system, the Tg of the resin, and on the desired degree of drying. To ensure redispersibility, it is generally necessary to add further protective colloids to the dispersion prior to the drying process, as an aid to spraying. The amount of spraying aid generally used is from 5 to 25% by weight, based on the polymeric constituents of the dispersion. It is preferable for the polyvinyl alcohols mentioned as component b) to be admixed, in the form of an aqueous solution, with the polymer dispersion prior to the spraying process.

During or after the spraying process, the desired amount of antiblocking agent (component c)) is added. To improve performance, other additives (component d)) may be added during or after the spraying process. Examples of other constituents which may be present in dispersion powder compositions are pigments, fillers, foam stabilizers, hydrophobicizing agents, wetting agents, and cement plasticizers.

For use in self-leveling screeds and trowel-applied flooring compositions (flowable compositions), the dispersion powder composition is admixed with the appropriate mixes. It is preferable to add from 0.5 to 10% by weight of dispersion powder, based on the dry weight of the mix. The mixes also comprise from 5 to 80% by weight of inorganic, hydraulically setting binders, such as cement, gypsum or mixtures of these. Cement is preferably used as binder. Another constituent of the mix is from 5 to 80% by weight of inorganic fillers, such as sand, powdered quartz, chalk, powdered limestone, filter ash, or a mixture of these. Additives which promote flow, such as casein or cement plasticizers, may also be added to the dry mixture to improve self-leveling properties. The % by weight data here are always based on 100% by weight of dry weight of the mix for trowel-applied flooring compositions. The ready-to-use flowable composition is finally obtained by adding water to the abovementioned dry mixture.

The ready-to-use trowel-applied flooring composition, once it has been mixed with water, can be used to produce screeds or self-leveling coatings for leveling, evening or smoothing substrates. For this, the aqueous trowel-applied flooring composition is poured out, distributed and dried, generally giving layer thicknesses of from 0.5 to 30 mm. Even when applying relatively thick layers, the procedure of the invention gives smooth surfaces with outstanding mechanical strength and hardness.

EXAMPLES

Materials used

Comparative dispersion 1:

Aqueous dispersion polymerized in the presence of polyvinyl alcohol (degree of hydrolysis 88 mol %, Höppler viscosity 4 mPas) and having a solids content of 50%, based on a styrene-butyl acrylate copolymer with a styrene content of 45% by weight and with a butyl acrylate content of 55% by weight.

Dispersion 2:

Aqueous dispersion polymerized in the presence of polyvinyl alcohol (degree of hydrolysis 88 mol %, Höppler viscosity 4 mPas) and having a solids content of 50%, based on a styrene-butadiene copolymer with a styrene content of 65% by weight and with a butadiene content of 35% by weight.

Polyviol M05/140:

Polyvinyl alcohol with a Höppler viscosity of 5 mPas in aqueous solution, and with a hydrolysis value of 140 (degree of hydrolysis of 88 mol %) from Wacker-Chemie GmbH.

Polyviol M13/140:

Polyvinyl alcohol with a Höppler viscosity of 13 mPas in aqueous solution, and with a hydrolysis value of 140 (degree of hydrolysis of 88 mol %) from Wacker-Chemie GmbH.

Polyviol G04/140:

Polyvinyl alcohol with a Höppler viscosity of 4 mPas in aqueous solution, and with a hydrolysis value of 140 (degree of hydrolysis of 88 mol %) from Wacker-Chemie GmbH.

PME (as in EP-A 477900):

Fully hydrolyzed copolymer made from isopropenyl acetate and vinyl acetate with a Höppler viscosity of 2.5 mpas in 4% strength aqueous solution, and with an isopropenyl content of 20 mol %, from Wacker-Chemie GmbH.

Melment F10:

Cement plasticizer based on a melamine-formaldehyde condensation product containing sulfonate groups and obtained from SKW Trostberg.

Wacker S670:

Silicone-based antifoam from Wacker-Chemie GmbH.

Agitan 305:

Antifoam based on liquid hydrocarbons, from Munzig Heilbronn.

Genapol PF20:

Nonionic emulsifier based on an ethylene oxide-propylene oxide copolymer, from Hoechst.

Example 1

4000 parts by weight of dispersion 2, 1100 parts by weight of polyviol M05/140 in the form of a 20% strength solution in water (10% by weight, based on resin), 13.2 parts by weight of Wacker S 670 (0.6% by weight, based on resin), and 500 parts by weight of water were mixed thoroughly. The mixture was sprayed through a twin-fluid nozzle. The component used for spraying was air compressed in advance to 4 bar, and the droplets formed were dried using a cocurrent of air heated to 125° C. The resultant powder was mixed with 10% by weight, based on the total weight of polymeric constituents, of commercially available anti-blocking agent (mixture of calcium magnesium carbonate and magnesium hydrosilicate).

Example 2

4000 parts by weight of dispersion 2, 1800 parts by weight of polyviol M13/140 in the form of a 10% strength solution in water (9% by weight, based on resin), 20 parts by weight of Agitan 305 (1% by weight, based on resin), 4 parts by weight of Genapol PF20 (0.2% by weight, based on resin), and 500 parts by weight of water were mixed thoroughly.

The mixture was sprayed through a twin-fluid nozzle. The component used for spraying was air compressed in advance to 4 bar, and the droplets formed were dried using a cocurrent of air heated to 125° C. The resultant powder was mixed with 10% by weight, based on the total weight of polymeric constituents, of commercially available anti-blocking agent (mixture of calcium magnesium carbonate and magnesium hydrosilicate).

Comparative Example 3

4000 parts by weight of dispersion 1, 1100 parts by weight of polyviol M05/140 in the form of a 20% strength solution in water (10% by weight, based on resin), 13.2 parts by weight of Wacker S670 (0.6% by weight, based on resin), and 500 parts by weight of water were mixed thoroughly. The mixture was sprayed through a twin-fluid nozzle. The component used for spraying was air compressed in advance to 4 bar, and the droplets formed were dried using a cocurrent of air heated to 125° C. The resultant powder was mixed with 10% by weight, based on the total weight of polymeric constituents, of commercially available anti-blocking agent (mixture of calcium magnesium carbonate and magnesium hydrosilicate).

Comparative Example 4

4000 parts by weight of dispersion 1, 1100 parts by weight of polyviol M05/140 in the form of a 20% strength solution in water (10% by weight, based on resin), 132 parts by weight of PME in the form of a 50% strength solution in water (3% by weight, based on resin), 13.2 parts by weight of Wacker S670 (0.6% by weight, based on resin), and 500 parts by weight of water were mixed thoroughly.

The mixture was sprayed through a twin-fluid nozzle. The component used for spraying was air compressed in advance to 4 bar, and the droplets formed were dried using a cocurrent of air heated to 125° C. The resultant powder was mixed with 10% by weight, based on the total weight of polymeric constituents, of commercially available antiblocking agent (mixture of calcium magnesium carbonate and magnesium hydrosilicate).

Performance testing
Production of a troweling composition:

| Material | Parts by weight |
| --- | --- |
| Portland cement 35F | 60 |
| EFA filler (electrostatic filter ash filler) | 15 |
| H33 quartz sand | 153 |
| Millicarb (calcium carbonate filler) | 30 |
| Carborex 20 (calcium carbonate filler) | 39 |
| Melment F10 (cement plasticizer) | 1.5 |
| Tamol NN9401 (cement plasticizer) | 1.5 |
| Total | 300 |

Production of test coating:

In the comparative experiment without addition of dispersion powder, 300 parts by weight of the troweling composition were intimately mixed with 51 parts by weight of water and then cast at 4 mm layer thickness onto a film.

In the case of those trowel-applied flooring compositions with dispersion powder, 290 parts by weight of the troweling composition were mixed with 10 parts by weight of dispersion powder. The composition was then mixed intimately with 51 parts by weight of water and cast at 4 mm layer thickness onto a film.

Testing for surface quality:

Assessment was visual, using the following evaluation scale:

1 very smooth, without any craters or pinholes 2 very smooth, without craters and with few pinholes 3 smooth, few craters, many pinholes 4 smooth, some craters, many pinholes Testing for hardness and scratch resistance:

Hardness and scratch resistance were tested by scratching with a knife. This also gives information on the wear resistance of the troweling composition.

Evaluation scale:

1 very, hard, very strongly bonded, very scratch-resistant 2 hard, strongly bonded, scratch-resistant 3 moderate hardness, moderately strongly bonded, moderately scratch-resistant 4 moderate hardness, poor bond strength, low scratch resistance The results are listed in the table below:

| Troweling composition | Surface quality | Hardness/scratch resistance |
| --- | --- | --- |
| Example 1 | 1 | 1 |
| Example 2 | 1 | 1 |
| Comparative Example 3 | 3 | 2 |
| Comparative Example 4 | 1 | 2 |
| Without powder | 3 | 4 |

Comparing Example 1 and Example 2 with Comparative Example 3 shows that only polyvinyl-alcohol-stabilized polymer powders based on styrene-butadiene copolymers give the required surface quality without smoothing additives. Using styrene-butyl acrylate powders as in Comparative Example 3 gives only unsatisfactory surfaces whose smoothness is just as poor as that of troweling compositions without addition of dispersion powder (see comparison without powder). Even after addition of smoothing additives as in EP-A 477900, the surface quality of styrene-butyl acrylate-modified troweling compositions (Comparative Example 4) does not reach the quality obtained by the use according to the invention of polyvinyl-alcohol-stabilized styrene-butadiene polymer powders.

What is claimed is:

1. A self-leveling, hydraulically-settable flooring composition, comprising
   a) from about 5 weight percent to about 80 weight percent of the total weight of said composition, based on solids, of one or more hydraulically setting inorganic binders;
   b) a vinyl aromatic-1,3-diene copolymer comprising from about 20 weight percent to about 80 weight percent of moieties derived from at least one vinyl aromatic monomer and from about 80 weight percent to about 20 weight percent of moieties derived from at least one 1,3-diene monomer, and up to about 30 weight percent of further monomers copolymerizable therewith, said weight percentages based on the weight of the copolymer, and totaling 100%;
   c) from 2 to 25 weight percent, based on the weight of the copolymer (b) of one or more protective colloids; and
   d) from 3 to 30 weight percent based on the sum of the weights of b) and c) of at least one fine antiblocking agent.

2. The composition of claim 1, further comprising from 0.1 to about 10 weight percent, based on the weight of the composition, of one or more additives selected from the group consisting of antifoams, pigments, fillers, foam stabilizers, hydrophobicizing agents, wetting agents, and cement plasticizers.

3. The composition of claim 1, wherein the copolymer (b) is free of any emulsifier.

4. The composition of claim 1, wherein said vinyl aromatic monomer is present in an amount of from 30 to 70 weight percent and said 1,3-diene monomer is present in an amount from 70 to 30 weight percent.

5. The composition of claim 1, containing up to a total of 30 weight percent of moieties derived from one or more comonomers selected from the group consisting of ethylene, vinyl chloride, $C_{1-15}$ (meth)acrylates, vinyl esters of branched carboxylic acids, and vinyl esters of unbranched carboxylic acids.

6. The composition of claim 1, wherein said copolymer (b) further comprises from 0.05 to 10 weight percent, based on the weight of the copolymer, of one or more termonomers selected from the group consisting of ethyleneically unsaturated mono- and dicarboxylic acids, ethylenically unsaturated carboxamides and carbonitriles, mono- and diesters of fumaric acid, mono- and diesters of maleic acid, maleic anhydride, ethyleneically unsaturated sulfonic acids and their sales, divinyl adipates, diallyl maleate, allyl methacrylate, triallyl cyanurate, acrylamidoglycolic acid, methyl methylacrylamidoglycolate, N-methylolacrylamide, N-methylolmethacrylamide, allyl N-methylolcarbamare, N-methylolacrylanmide alkyl ethers, N-methylolmethacrylamide alkyl ethers, N-methylolmethacrylamide alkyl esters, allyl N-methylolcarbamate alkyl ethers, allyl N-methylolcarbamate alkyl esters, epoxy-functional comonomers, silicon-functional comonomers, and monomers having hydroxyl or CO groups.

7. The composition of claim 6, wherein said one or more termonomers are selected from the group consisting of acrylic acid, methacrylic acid, fumaric acid, maleic acid, acrylamide, acrylonitrile, vinylsulfonic acid, 2-acrylamido-2-methylpropanesulfonic acid, glycidyl methacrylate, glycidyl acrylate, acryloxypropyltri(alkoxy)silanes, methacryloxypropyltri(alkoxy)silanes, vinyl-trialkoxysilanes, vinylmethyldialkoxysilanes, hydroxyalkyl methacrylates, hydroxyalkyl acrylates, hydroxyalkyl methacrylates, hydroxyalkyl acrylates, diacetoneacrylamide, and acetylacetoxyethyl (meth) acrylate.

8. The composition of claim 1, wherein copolymer b) is in the form of a dispersion powder, and is present in a dry mix of the remaining components in an amount of from 0.5 to 10 weight percent based on the weight of the dry mix.

9. The composition of claim 1, further comprising from 5 to 80 weight percent based on the weight of the composition, of an inorganic filler.

10. The composition of claim 1, wherein said protective colloid c) comprises at least one polyvinyl alcohol with a degree of hydrolysis of from 80 to 95 mol percent and having a Höppler viscosity of from 1 to 30 mpas in 4 weight percent aqueous solution.

11. The composition of claim 1, herein said protective colloid c) comprises at least one hydrophobically modified polyvinyl alcohol with a degree of hydrolysis of from 80 to 95 mol percent and having a Höppler viscosity of from 1 to 30 mPas in 4 weight percent aqueous solution.

12. A process for preparing a snob self-leveling, hydraulically set floor covering, said process comprising adding water to the composition of claim 1 to form a flowable composition, applying said flowable composition to said floor, and allowing said flowable composition to set.

13. A process for preparing a self-leveling, hydraulically set floor covering, said process comprising adding water to the composition of claim 2 to form a flowable composition, applying said flowable composition to said floor, and allowing said flowable composition to set.

14. A process for preparing a self-leveling, hydraulically set floor covering, said process comprising adding water to the composition of claim 3 to form a flowable composition, applying said flowable composition to said floor, and allowing said flowable composition to set.

15. A process for preparing a self-leveling, hydraulically set floor covering, said process comprising adding water to the composition of claim 4 to form a flowable composition, applying said flowable composition to said floor, and allowing said flowable composition to set.

16. A process for preparing a self-leveling, hydraulically set floor covering, said process comprising adding water to the composition of claim 5 to form a flowable composition, applying said flowable composition to said floor, and allowing said flowable composition to set.

17. A process for preparing a self-leveling, hydraulically set floor covering, said process comprising adding water to the composition of claim 6 to form a flowable composition, applying said flowable composition to said floor, and allowing said flowable composition to set.

18. A process for preparing a self-leveling, hydraulically set floor covering, said process comprising adding water to the composition of claim 7 to form a flowable composition, applying said flowable composition to said floor, and allowing said flowable composition to see.

19. A process for preparing a self-leveling, hydraulically set floor covering, said process comprising adding water to the composition of claim 8 to form a flowable composition, applying said flowable composition to said floor, and allowing said flowable composition to set.

20. A process for preparing a self-leveling, hydraulically set floor covering, said process comprising adding water to the composition of claim 9 to form a flowable composition, applying said flowable composition to said floor, and allowing said flowable composition to set.

21. The composition of claim 1, wherein the antiblocking agent (d) has a particle size from 10 μm to 10 μm.

* * * * *

UNITED STATES PATENT AND TRADEMARK OFFICE
CERTIFICATE OF CORRECTION

PATENT NO. : 6,632,861 B1  
DATED : October 14, 2003  
INVENTOR(S) : Hans-Peter Weitzel et al.

It is certified that error appears in the above-identified patent and that said Letters Patent is hereby corrected as shown below:

<u>Column 8,</u>  
Line 45, delete "fine";

<u>Column 9,</u>  
Line 6, delete "their sales" and insert therefor -- their salts --;  
Line 9, delete "N-Methylolcarbamare" and insert therefor -- N-Methylolcarbamate --;  
Line 46, delete "snob".

Signed and Sealed this

Ninth Day of March, 2004

JON W. DUDAS  
*Acting Director of the United States Patent and Trademark Office*